Patented Feb. 21, 1950

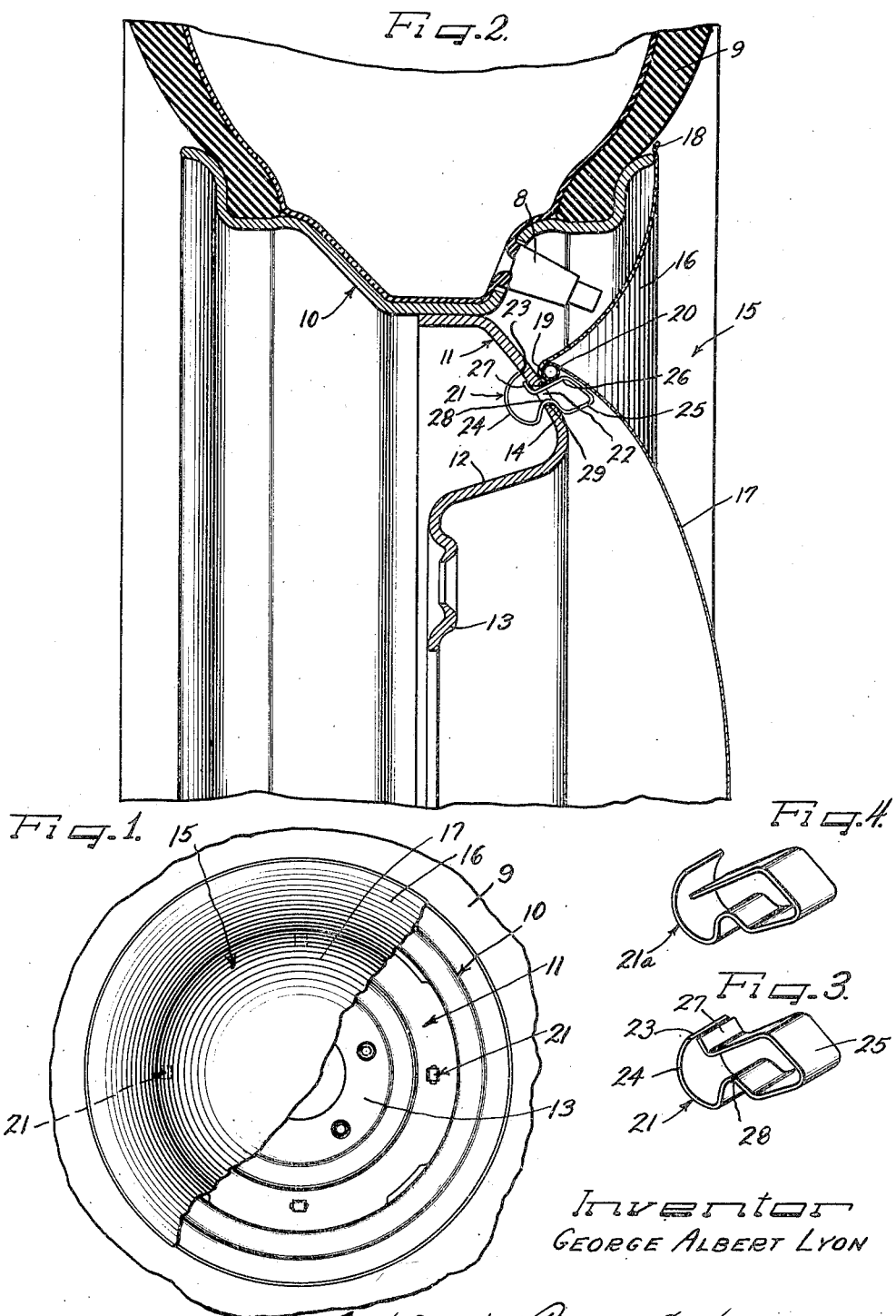

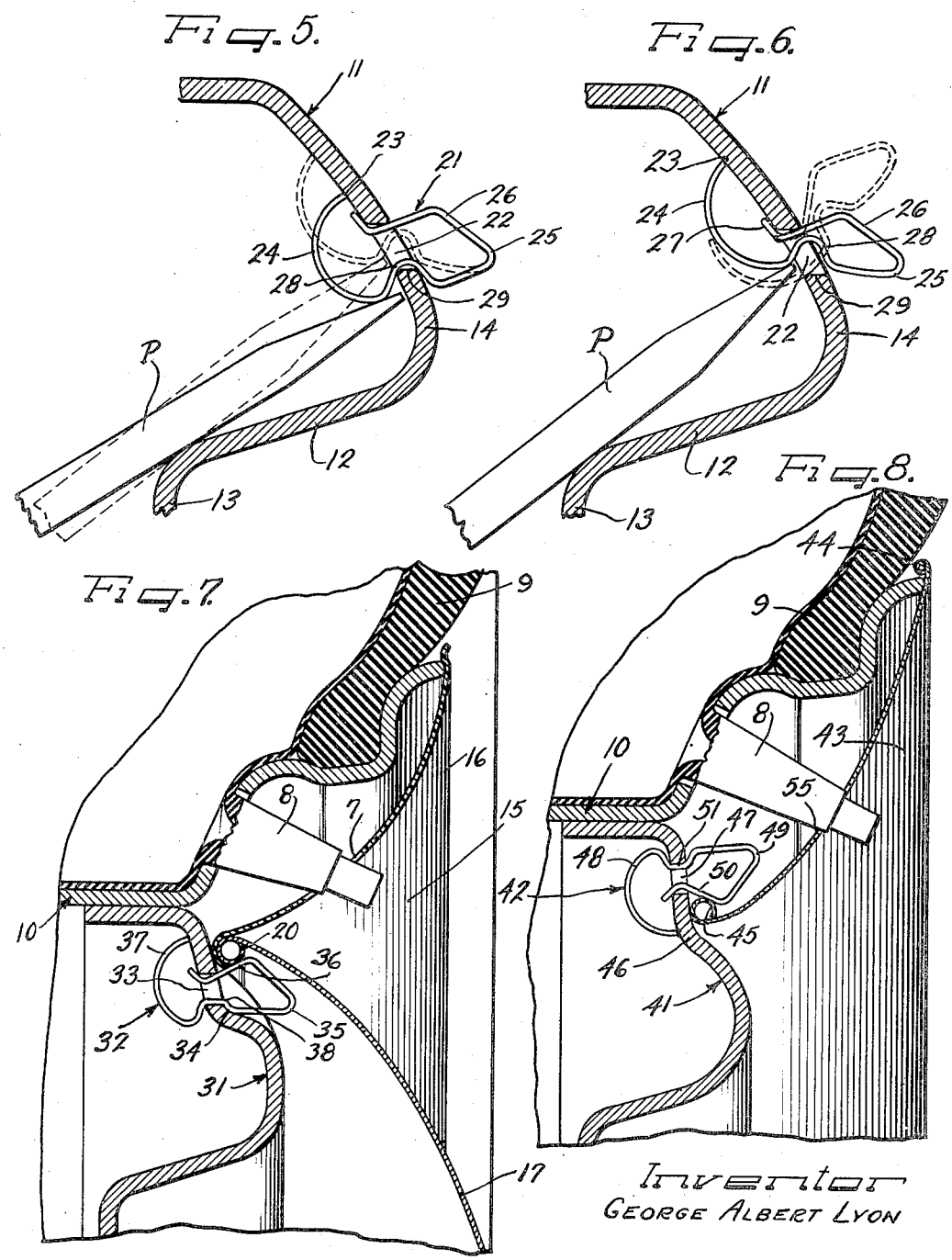

2,497,896

UNITED STATES PATENT OFFICE 2,497,896

WHEEL COVER

George Albert Lyon, Allenhurst, N. J.

Application August 27, 1945, Serial No. 612,846

8 Claims. (Cl. 301—37)

This invention relates to wheel structures and more particularly to cover or hub cap retaining means.

It is an object of this invention to provide an improved and simplified form of cover or hub cap retaining means similar to that disclosed in my Patent No. Re. 22,119 granted June 16, 1942.

In the past it has been the practice in the automotive industry to attach hub cap or wheel cover retaining spring clips to a part of the wheel by means of rivets or the like. Such fastening means has been unsatisfactory for a number of reasons. The principal among these reasons is the fact that the perforating of the wheel part to accommodate the rivets, results in a weakening of that part. This is of considerable moment where the perforations are made in the wheel body or spider part, which is the load bearing part of the wheel.

Another disadvantage of this type of attaching means resides in the fact that it necessitates sufficient clearance for the application of the rivets, and as a consequence, the clips must project a considerable distance away from the wheel. This materially affects the shape of the cover or hub cap that engages the clips, since that cover must be sufficiently deep so that the clips can extend into the interior of the same.

An aim of this invention is to dispense with the necessity of having to perforate the load bearing part adjacent its central portion, or in other words, I propose to provide a mounting for the spring clips which may be located nearer to tire part of the wheel. This is advantageous since the perforated areas will in that event be closer to the tire rim where the wheel has greater strength than would be true if the perforations were at the center portion of the body part.

Yet another object of this invention relates to the provision of a simple form of hub cap or cover retaining spring clip which can be detachably snapped into retained engagement with a part of the wheel.

A further object of the invention is to provide a detachable spring clip similar to that disclosed in my aforesaid patent but which does not depend upon a biting engagement for its retention on the body part.

Still another object of the invention is to provide a detachable spring clip wherein the free extremity, for cooperation with the cover, can project into the wall of the body part so that the retaining portion of the clip is in very close proximity to the outer surface of the body part. This is very advantageous in that it enables the cooperating edge of the cover to be brought into very close proximity to the body part, thus enabling the cover to extend deeper into the wheel, and thereby enabling an enhancing of the ornamental appearance of the wheel.

A further object of the invention relates to the provision of a cover retaining spring clip which may be very economically manufactured on a large production basis from spring steel strip.

Another and still further object of the invention is to provide a cover assembly for a wheel wherein the cover can be detachably held on the wheel in close proximity to the base flange of the tire rim and relatively close to the medial plane of the wheel.

In accordance with the general features of this invention, there is provided in a wheel structure including a wheel body part having apertures adjacent its outer peripheral margin, cover retaining spring clips associating with the apertures, there being one for each aperture, and each clip including a portion insertable through the aperture and engaging the under surface of the body part, and a free outer cover retaining extremity likewise projecting into the aperture, the aperture being smaller than the clip, so that the clip after insertion therein retains itself in a firm position on the body part with its free extremity properly located for retaining cooperation with the cover.

Another feature of the invention relates to the provision of a cover retaining spring clip comprising a strip of metal having its ends turned back upon itself into loops facing generally in the same direction, and provided between the loops with an intermediate shouldered portion for engagement over an edge of an opening in the body part to retain the clip thereon.

Still another feature of the invention relates to the forming of the extremity of one of the loop portions into an angular shoulder adapted to extend into the aperture in the body part and being resiliently yieldable for tensioned retaining cooperation with an edge of a cover part.

Other objects and features of this invention will more fully appear from the following detailed description taken in connection with the accompanying drawings which illustrate several embodiments thereof, and in which:

Figure 1 is a fragmentary side view of a wheel structure embodying the features of this invention and showing the location of my novel cover retaining spring clips;

Figure 2 is an enlarged fragmentary sectional view taken on substantially the line II—2 of Figure 1, looking in the direction indicated by the arrows;

Figure 3 is an isometric view of one of my novel cover retaining clips;

Figure 4 is a view similar to Figure 3, illustrating a modified form of clip;

Figure 5 is an enlarged fragmentary cross sectional view taken through the body part of the wheel at one of the clips and showing by dotted lines how the clip can be deflected for removal from the aperture in the body part;

Figure 6 is a fragmentary sectional view similar to Figure 5 and showing by dotted lines the ultimate position to which the clip can be moved just prior to its being pulled out of the aperture;

Figure 7 is a fragmentary cross sectional view similar to Figure 2 showing a modification of the invention; and Figure 8 is a fragmentary sectional view similar to Figure 2 illustrating a still further form of the invention.

As shown on the drawing:

The reference character 9 designates generally a conventional automobile pneumatic tire and tube supported in the usual way by a multi-flanged tire rim 10 of the so-called drop center type. This is the type of tire rim that is now extensively used in the automotive industry.

In a wheel of this structure it is conventional to support the tire rim 10 on a body or load bearing part 11 suitably fastened to the base flange of the tire rim part. This load bearing part is sometimes referred to as a wheel spider. This is especially true where the spider is provided with openings so as to simulate an actual spider.

The load bearing part 11 usually comprises a metallic stamping and includes a centrally dished portion 12 extending axially rearwardly and terminating in a generally radially extending bolt-on flange 13. This flange, as is the common practice, is apertured to accommodate bolts or cap screws (not shown) for securing the wheel to a part on an axle of a vehicle.

It will be appreciated that due to the fact that the body part 11 is the load bearing member of the wheel, it must be structurally designed so as to fully stand up under even the most severe road conditions. It must be so designed from an engineering standpoint that proper strength is provided wherever any weakening holes or apertures are made in the body part. One of the stressed portions of the body part is the bulged nose portion 14 which acts as a rigidifying corrugation and thus enables the body part to better resist distorting strains and stresses.

At present it is customary to fasten by rivets or the like hub cap retaining spring clips to the central dished portion of the body part. Needless to say, the central portion of the body part is subjected to relatively great strains in the use of the wheel, as most of the weight of the wheel is radially outwardly therefrom. For this reason I have sought to provide for the retention of spring clips, such as the clips 21 on the body part closer to the rim part where the body part has greater strength. One of the difficulties I have encountered is that due to the nose portion 14 being the axially outermost portion of the body part, the clips when attached thereto project too far axially outwardly, thereby necessitating that the cover or hub cap be deepened at its attaching margin or shoulder.

Now, it is desired from the standpoint of ornamentation that the attaching or axially inner margin of the cover or hub cap be curved inwardly to a position as close to the body part as is feasible. For this reason it is very desirable that the spring clip be so attached that its retaining extremity will only project to a relatively slight extent beyond the outer surface of the body part. This I have accomplished in my new spring clip 21 and the various modifications of the same to be hereinafter described.

It is to be noted that my invention is equally applicable for use either with a hub cap or trim ring or an assembly of both of them as shown in Figure 2. In this form of the invention, the cover assembly is designated generally by the reference character 15 and includes an outer annular trim ring 16 and a central crowned hub cap 17. The hub cap, however, can be retained on the wheel by the clips 21 even though the trim ring 16 is omitted. Also as shown in Figure 8, to be hereinafter described, the spring clips of my invention may be used to advantage in holding only a trim ring on the wheel.

The trim ring 16 may be made of any suitable material such, for example, as strip steel, plastic or the like. I preferably, however, in the case of the ring 16 contemplate making it of a synthetic plastic such, for example, as ethyl cellulose, cellulose acetate or vinyl resins.

The ring 16 as is true in all forms of my invention is of a bowed or concave-convex cross sectional extent. It has its outer edge 18 slightly turned so as to overhang an outer edge of a flanged rim part in close proximity to the curved outer side wall of the tire. This ring as is true of all forms, extends generally axially and radially inwardly from the turned edge 18 to an inner turned edge in close proximity to the base flange of the rim part, and at a point where it can be bottomed on the outer surface of the body part.

In Figure 2 I have designated the turned portion by the reference character 19 and it will be perceived that this turned portion is of such diameter that the turned outer edge 20 of the hub cap can tightly nest in the same. This enables the hub cap to hold the trim ring 16 in properly centered relation on the wheel.

In addition the nested arrangement is such that the turned edge 20 presents an inner surface for retaining cooperation with my novel spring clips 21. These spring clips are arranged in a generally common circle and each of them is detachably snapped through an aperture 22 in the nose portion 14 of the body part for retention thereby. The outer extremities of these clips to be hereinafter described, are so located that they will resiliently yield under the camming effect of the hub cap edge 20 when the same is pressed home into retained cooperation with the spring clips.

It will be noted from Figure 2 that the cross sectional contour of the trim ring 16 is such that the valve stem 8 can be concealed thereby. It is contemplated, however, as shown in Figures 7 and 8 that the valve stem could extend through an opening in the trim ring. In Figure 2, however, this is not necessary since access may be had to the valve stem upon the manual flexure of the trim ring 16 away from the rim part. This can be effected by the operator manually gripping a portion of the edge 18 and pulling the same slightly away from the wheel to an extent sufficient to enable the insertion of an air line nozzle there behind.

The curvature of the trim ring which I previously described is such that in use the trim ring appears to constitute a radial inner continuation of the white wall of the tire. This appearance can be accentuated when the ring 16 has an external white appearance, in which event it will appear to the on-looker as a white wall portion of the tire. Thus the tire can be given the appearance of being much more massive than it in reality is, and this appearance is such that an illusion is afforded in which the tire appears to extend clear down to the outer edge of the hub cap 17. As noted before, this desirable ornamental effect can be utilized in all forms of my invention to be described hereinafter.

In Figure 3 I have illustrated one of the forms of my novel detachable snap on spring clip 21. This clip comprises a small section of a strip of spring steel or the like and has its ends formed into loop portions 24 and 25 turned back upon the main body of the clip. These portions face generally in the same direction, or in other words, when the clip is on the wheel, they face generally radially outwardly.

The turned portion 24 which constitutes the rear portion of the clip in use is of a generally symmetric curvature, and the extreme radial outer edge 23 thereof is adapted to bear against the under surface of the body part radially beyond the cooperating aperture 22. The turned portion 25 is somewhat like a goose neck portion and has an angular extremity 26, the angle of which is predetermined so as to enable the extremity 26 to have a wedge like retaining engagement with the hub cap edge 20. This angular portion may terminate in an inclined radial lip 27, which as shown in Figure 2, is likewise adapted to engage the under surface of the body part. This lip 27, however, may be dispensed with as shown in Figure 4 wherein the clip 21a is identical to the clip 21 with the exception of the omission of this lip.

In both of these forms, however, the angular extremity 26 is adapted to project toward the loop portion 24 and through the aperture 22 in the body part. This arrangement is such as to provide ample clearance for the movement of the angular extremity 26 in its cooperation with the cover, and yet still enables the axially outer turned portion 25 of the clip to be located in relatively close proximity to the outer curved surface of the nose portion 14 of the body part.

The purpose of the lip portion 27 when it is used is to preclude the accidental pulling of the angular extremity 26 out of the cooperating aperture 22.

It will also be perceived that the main body portion of the clip 21 is provided with an intermediate bend or shoulder portion 28 which extends toward the extremity 26 and is so shaped as to hook over and engage an edge 29 of the body part defining one side of the aperture 22.

Now each of the clips of my invention may be easily applied to or removed from the wheel by a snap-on or snap-off action. In Figure 6, I have illustrated by dotted lines the manner in which rear loop portion 24 of the clip can be first inserted in the aperture 22. Thereafter the clip may be rocked or turned from the dotted line position to the full line position shown in Figure 5 in which the intermediate bend or shoulder is locked with the edge 29. Of course it is clear that in making this insertion the angular portion 26 must be manually pressed toward the body of the clip to an extent sufficient to enable it to be inserted in the opening 22. After the insertion of the free extremity 26 in the opening and the release of the manual pressure thereon, it will spring outwardly into tensioned engagement with the other edge of the wheel aperture and into a proper position for retaining cooperation with the edge of the cover. By reason of this stressing of the extremity 26, the clip is caused to be wedged into tightly seated engagement with the edge 29; that is to say, the resilient pressure exerted by the free end 26 against the other and outer edge of the opening forces the shoulder or bent portion 28 tightly against the radially inner edge 29.

When the clips are thus attached to the wheel, which clips are all identical in construction, the hub cap may be pressed axially over the free extremities 26 into a position in which the edge 20 of the cap is clampingly wedged toward the body part 11 in retained cooperation therewith. Moreover, this retention of the cap 17 on the wheel will also cause the trim ring 16 to be clamped to the wheel by reason of the edge 20 of the hub cap being nested in the inner edge 19 of the trim ring.

To remove the cover assembly it is necessary to slightly deflect the plastic portion 16 and insert a pry-off tool there behind for engagement under the nested edges 19 and 18 of the cover assembly, for forcibly ejecting the same from retained cooperation with the spring clips.

If the trim ring 16 is made of metal as is true of the trim ring shown in Figure 8, the pry-off tool can be applied directly to the outer edge of the trim ring.

When it is desired to remove the spring clips 21 each of them may be easily removed by the use of a pry-off tool or screw driver P, as shown in Figures 5 and 6. This tool can be inserted in the body part from the rear of the wheel and engaged under the loop portion 24, as shown in Figure 5. By movement of the tool from the full line position shown in Figure 5 to the dotted line position, it is possible to unseat the bend or shoulder 28 from the edge 29 of the body part. Thereafter the clip can be rocked or turned to the dotted line position shown in Figure 6, in which both extremities 23 and 27 of the clip can be withdrawn from the opening. It is clear from the illustrations in Figure 6 that the pry-off tool not only unseats the intermediate bend 28, but also compresses the loop portion 25 of the clip.

The same clip can be used over again if it is damaged, a new clip can be substituted for it without necessitating any machine operations in order to attach it to the wheel. However, once the clip is mounted on the wheel, it is in abutting engagement with opposite surfaces of the body part and thus is firmly held in a tensioned engagement with the body part in a position ready to have the hub cap or cover cammed over its free angular extremity 26 into retaining engagement with the cover. Of course, the camming of the extremity 26 of the clip toward the body of the clip results in this extremity having a tensioned engagement with the edge 20 of the cover. That is to say, the extremity 26 upon deflection by the cap or cover, is not permitted to completely return to its initial position, and hence the tension stored up in the same is available for gripping or clamping pressure against the cover. Then too, the angular shape of the extremity 26 is such that the force is applied in a direction to wedge the cover edge 20 against the body part 11.

In Figure 7 I have illustrated a modification of the invention wherein I have used the same reference characters to designate parts identical to those described in Figure 2. The principal difference between this form and that of Figure 2 resides in the shape of the body part 31. This body part comprises a stamping, and as in the case of the body part 11, carries the tire rim 10. Co-operable with the tire rim 10 and the body part 31 is a wheel cover assembly substantially similar to the assembly 15 and hence I have used the same reference characters thereon. This assembly 15 includes a trim ring 16 and a hub cap 17. As noted before, as an alternative, the trim ring 16 can be provided with an opening, such as the opening 7, through which the valve stem 8 can project.

The outer turned edge 20 of the hub cap is nested in the inner turned edge of the trim ring and is positioned for retaining engagement by the clips 32.

The body part 31 has a plurality of apertures 33, one for each of the spring clips 32. These apertures are located in a common circle adjacent the base flange of the rim part. As distinguished from the first form of the invention, each of the apertures 33 is located in a slightly rearward indentation 34 in the body part. The advantage of this arrangement is that greater strength is provided in the body part at the aperture for compensating for the same. A further advantage is that the indentation provides a recess in which the outer turned portion 35 of the clip 34 can project, thereby enabling the free extremity 36 of the clip to be brought into even closer proximity to the medial plane of the wheel.

The clip 32 like the clip 21 also has a rear turned portion 37 which is connected to the outer turned portion by an intermediate bend or shoulder portion 38 adapted to be nested over an edge of the opening. The outer angular extremity 36 of this clip is of a slightly different shape than that of clip 21, but in general functions in identically the same way.

Since this clip operates in substantially the same manner as the previous clip and has all the advantages of the same, it is believed that no further description of the same is necessary.

In the form of the invention shown in Figure 7, the tire rim part 10 is mounted upon a slightly different shaped body part 41 and the clip 42 is also of a different shape from that of clip 21. In addition it differs from clip 21 in that it is arranged to be mounted on the body part 41 in a reverse position from that shown in Figure 2. The reason for this is that in this form of the invention, the clips are employed for detachably holding on the wheel only a trim ring 43. The trim ring 43 in this form is preferably made of sheet metal and has an outer edge 44 overhanging an edge of the rim part 10 and an inner turned or rolled edge 45 bottomed against an axial indentation 46 having a plurality of clip receiving apertures 47, there being one for each clip 42. This clip includes a rear loop portion 48, an outer loop portion 49, having a yieldable cover retaining extremity 50, and an intermediate bend or shouldered portion 51 adapted to be nested over and locked to an edge of the opening 47.

While this clip is insertable and removable with respect to the body part in substantially the same way as the previous ones, it is, however, in operation oppositely positioned from the other clips. That is to say, the free yieldable extremity 50 of each of these clips faces the axis of the wheel instead of the rim part of the wheel. In applying the trim ring 43 to the wheel it is first placed over the wheel with its aperture 55 opposite the valve stem 8 and then it is pressed axially home against the body part 41 and the outer edge of the rim part. In the course of this application, the free extremities 50 of the spring clips 42 are cammed under tension radially outwardly so that thereafter they resiliently wedge the edge 45 against the body part to hold the trim ring on the wheel. Removal of the trim ring may be easily effected by inserting a pry-off tool under its edge 45 and forcibly ejecting it from its engagement with the spring clips.

This latter form of the invention may be used with a conventional hub cap (not shown) mounted in the usual way at the center of the wheel.

In all forms of the invention the application of the edge of the cover or wheel trim to the inclined free extremities of the clips results in a rocking movement of the clip. That is to say, the intermediate portion of the clip tends to rock about its seat in the aperture of the wheel body part.

During the course of this rocking movement, the rear edge of the clip slides along the undersurface of the body part and thus tends to limit and restrict the extent of the rocking movement. In addition, this bearing of the rear edge of the clip on the undersurface of the body part results in a firm holding of the clip against transverse cocking movement of the clip in the aperture. Thus the clip is at all times held in effective position and against sliding circumferentially along the edge of the trim or cover engaged thereby.

I claim as my invention:

1. In a wheel structure including a tire rim and a body part having a plurality of spaced apertures, a plurality of cover retaining spring clips, each including a body portion projecting into one of said apertures for a snap on engagement with an edge of the aperture and a looped portion having an inclined free extremity for yieldable and detachable engagement by an edge of a cover, said extremity also projecting into said aperture into tensioned engagement with said body part to hold the clip body portion in engagement with said edge of the aperture.

2. In a wheel structure including a tire rim and a body part having a plurality of spaced apertures, a plurality of cover retaining spring clips, each including a body portion projecting into one of said apertures for a snap on engagement with an edge of the aperture and a looped portion having an inclined free extremity for yieldable and detachable engagement by an edge of a cover, said body portion including a depression for nestingly receiving said edge of the aperture, said free extremity also projecting into said aperture and engaging the edge thereof opposite to engagement of the aperture edge by the body portion of the clip and cooperating with the body portion to hold the clip in the aperture.

3. In a wheel structure including a tire rim and and a body part having a plurality of spaced apertures, a plurality of cover retaining spring clips, each including a body portion projecting into one of said apertures for a snap on engagement with an edge of the aperture and a looped portion having an inclined free extremity for yieldable and detachable engagement by an edge of a cover, said clip body portion also having a turned end portion beyond said aperture to the rear of the body part and engaging the body part endwise for holding the clip against rocking out of position.

4. In a wheel structure adapted to carry an automobile tire, a body part comprising a dished metallic stamping including a central mounting flange and a radially outer nose portion bulged axially outwardly, said nose portion having a plurality of spaced apertures, and a plurality of cover retaining spring clips, each of which is associated with one of said apertures and each of which comprises a strip of springy metal and having between its ends an intermediate depressed portion for interlocking engagement with an edge of the aperture and opposite end looped portions the axially innermost of which is positioned to the rear of the body part and the axially outermost of which is formed into an inclined yieldable cover engaging extremity.

5. In a wheel structure adapted to carry an automobile tire, a body part comprising a dished metallic stamping including a central mounting flange and a radially outer nose portion bulged axially outwardly, said nose portion having a plurality of spaced apertures, a plurality of cover retaining spring clips, each of which is associated with one of said apertures and each of which comprises a strip of springy metal and having between its ends an intermediate depressed portion for interlocking engagement with an edge of the aperture and opposite end looped portions the axially innermost of which is positioned to the rear of the body part and the axially outermost of which is formed into an inclined yieldable cover engaging extremity, and a cover part provided with an edge engaging said extremity to be detachably clamped thereby toward the nose portion of the body part, said axially innermost loop portion having the end thereof in engagement with the rear of the body part to hold the clip against tilting when engaged by the cover part as aforesaid.

6. In a wheel structure adapted to carry an automobile tire, a body part comprising a dished metallic stamping including a central mounting flange and a radially outer nose portion bulged axially outwardly, said nose portion having a plurality of spaced apertures, a plurality of cover retaining spring clips, each of which is associated with one of said apertures and each of which comprises a strip of springy metal and having between its ends an intermediate depressed portion for interlocking engagement with an edge of the aperture and opposite end looped portions the axially innermost of which is positioned to the rear of the body part and the axially outermost of which is formed into an inclined yieldable cover engaging extremity, and a cover part provided with an edge engaging said extremity to be detachably clamped thereby toward the nose portion of the body part, said extremity projecting through said aperture toward the rear spring looped portion.

7. In a wheel structure adapted to carry an automobile tire a body part comprising a dished metallic stamping including a central mounting flange and a radially outer nose portion bulged axially outwardly said nose portion having a plurality of spaced apertures, a plurality of cover retaining spring clips, each of which comprises a strip of springy metal and having between its ends an intermediate depressed portion for interlocking engagement with an edge of the aperture and opposite end looped portions the axially innermost of which is positioned to the rear of the body part and the axially outermost of which is formed into an inclined yieldable cover engaging extremity, and a cover part provided with an edge engaging said extremity to be detachably clamped thereby toward the nose portion of the body part, said extremity having its extreme end yieldably urged behind the body part to the rear of the associated aperture.

8. In a wheel structure having a body part comprising a dished metallic stamping including a central mounting flange and a radially outer nose portion bulged axially outwardly, said nose portion having a plurality of spaced apertures at the radially outer side thereof, a cover for said body part having a portion thereof in engagement with the body part radially outwardly adjacent to said apertures, and a plurality of cover retaining spring clips one of which is associated with each of said apertures, each of said clips comprising a strip of spring metal having the opposite portions thereof formed into respective return bent open loops having the free ends thereof in relatively close proximity, the clip body between the loops having an inward depression providing an outwardly opening groove retainingly engaging an edge of the associated aperture, the inner one of said loops being of substantially greater diameter than the width of the aperture and having its end in engagement with the inner face of the body part, the free end portion of the outer loop engaging the opposite side of the aperture from said depression groove in a tensioned condition for urging the depression groove into seating relation to the contiguous aperture edge, and said free portion having a generally axially inwardly facing cover-retaining shoulder, said outer loop being compressible to spring said body portion free from the aperture edge and said inner loop being formed to be withdrawn through the aperture while said outer loop is in said compressed position and the clip is tilted toward said free end portion.

GEORGE ALBERT LYON.

REFERENCES CITED

The following references are of record in the file of this patent:

UNITED STATES PATENTS

| Number | Name | Date |
| --- | --- | --- |
| Re. 22,119 | Lyon | June 16, 1942 |
| 1,943,261 | Knutson | Jan. 9, 1934 |
| 1,981,973 | Tinnerman | Nov. 27, 1934 |
| 2,088,109 | Horn | July 27, 1937 |
| 2,205,653 | Hunt et al. | June 25, 1940 |
| 2,217,116 | Hunt et al. | Oct. 8, 1940 |
| 2,317,393 | Lyon | Apr. 27, 1943 |